United States Patent [19]

Rushforth et al.

[11] Patent Number: 4,718,702
[45] Date of Patent: Jan. 12, 1988

[54] EXPANSIBLE COUPLING

[75] Inventors: Calvin Rushforth, Andover; Walter L. Brassert, Belmont, both of Mass.

[73] Assignee: Northern Research & Engineering Company, Woburn, Mass.

[21] Appl. No.: 795,478

[22] Filed: Nov. 6, 1985

[51] Int. Cl.⁴ ............................................. F16L 27/12
[52] U.S. Cl. .................................. 285/114; 285/301; 285/187; 285/370; 285/229
[58] Field of Search .................. 285/94, 114, 301, 298, 285/187, 300, 299, 229, 224, 225, 226, 370

[56] References Cited

U.S. PATENT DOCUMENTS

| 349,365 | 9/1886 | Roots | 403/50 |
|---|---|---|---|
| 1,197,496 | 9/1916 | Jobling | 285/229 |
| 1,726,483 | 8/1929 | Giesler | 285/300 |
| 1,786,506 | 12/1930 | Ray | 285/300 |
| 2,207,146 | 7/1940 | Fentress et al. | 285/300 |
| 2,209,325 | 7/1940 | Dennis | 285/300 |
| 2,341,066 | 2/1944 | Wiederkenr | 285/229 |
| 2,406,234 | 8/1946 | Marancik | 285/187 |
| 2,470,167 | 5/1949 | Hobbs | 285/229 |
| 2,557,304 | 6/1951 | McLeod | 285/224 |
| 3,490,794 | 1/1970 | Swanson | 285/300 |
| 3,633,946 | 1/1972 | Kazmierski | 285/229 |
| 4,416,475 | 11/1983 | Stacey | 285/229 |

FOREIGN PATENT DOCUMENTS

| 752498 | 10/1952 | Fed. Rep. of Germany | 285/229 |
|---|---|---|---|
| 572110 | 5/1924 | France | 285/300 |
| 635616 | 3/1928 | France | 285/229 |
| 14137 | of 1892 | United Kingdom | 285/229 |
| 695015 | 8/1953 | United Kingdom | 285/301 |

Primary Examiner—Eric K. Nicholson
Attorney, Agent, or Firm—Bernard J. Murphy

[57] ABSTRACT

The coupling comprises a sleeve which receives a pair of tubular elements thereabout. One of the elements is pinned to the sleeve, and the other has a restricted, axially-movable relationship with the sleeve. Terminal ends of the tubular elements are spaced apart, in a mutually confronting relationship, and have mounted thereto circular and resilient webs or discs. The peripheries of the discs are fastened together, and the discs resiliently flex to accommodate for expansion and contraction of the tubular elements.

13 Claims, 5 Drawing Figures

U.S. Patent    Jan. 12, 1988    4,718,702
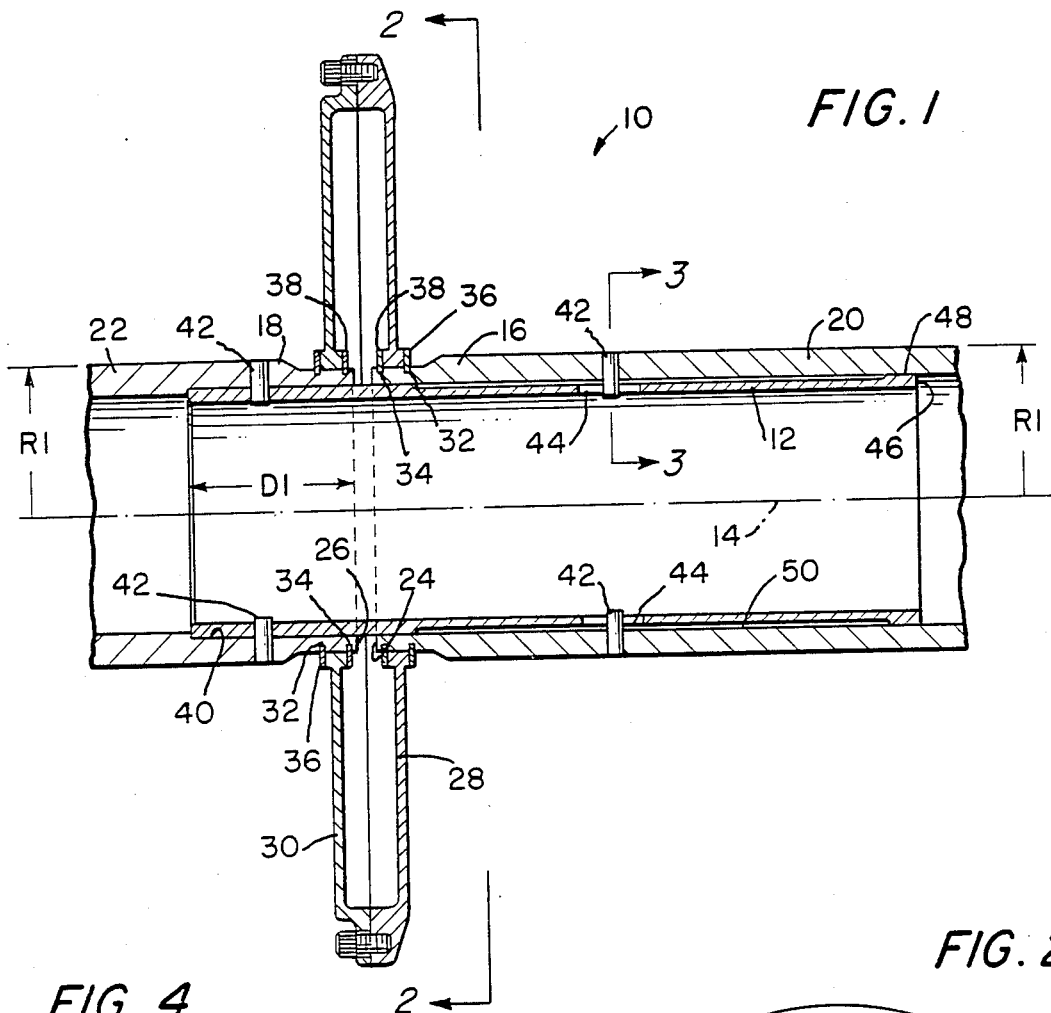
FIG. 1
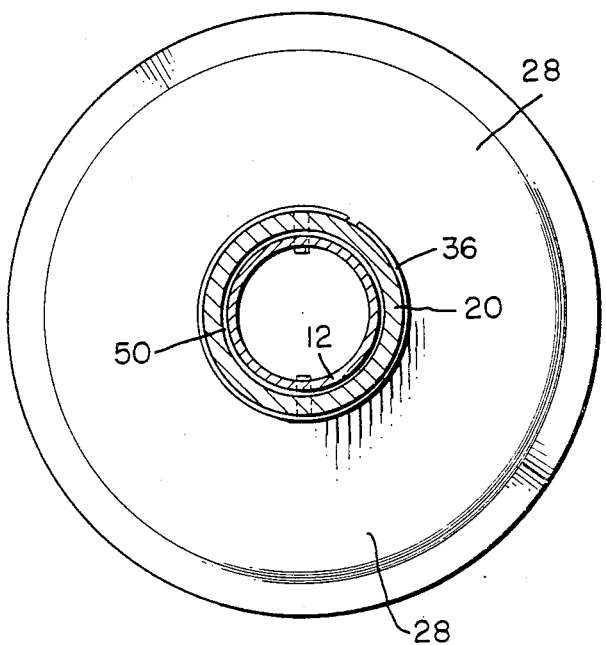
FIG. 2
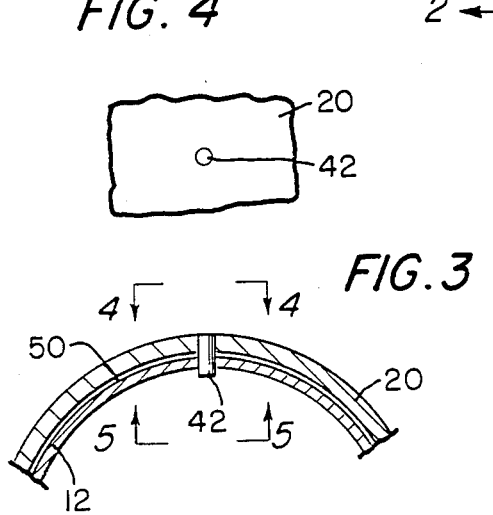
FIG. 4
FIG. 3
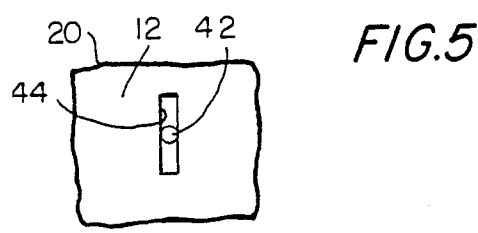
FIG. 5

EXPANSIBLE COUPLING

The Government has rights in this invention pursuant to Contract No. N00140-82-C-0799 awarded by the Department of Defense as represented by the U.S. Navy.

This invention pertains to couplings for tubular elements, such as shafts, or housings, or the like, and in particular to such couplings confining and/or mounting therewithin a shaft subject to thermal elongation and contraction.

Couplings of the type to which this invention pertains are known in the prior art. Exemplary thereof is U.S. Pat. No. 349,365, issued to F. M. Roots on Sept. 21, 1886 for a Shaft Coupling. The Patentee's Coupling comprises a pair of circular discs, having central hubs, fastened together about the peripheries thereof, and receiving within the hubs confronting and spaced-apart ends of shafts. A key is interposed between the shaft ends and the hubs.

Such prior art couplings are not efficient in that, as disclosed in the Roots patent, they have no means for maintaining a necessary axial alignment between the shaft ends. The key, in the Roots patent, is quite inadequate for the purpose. More, the patentee allows as how his Coupling is useful even if the shafts are out of alignment. Also, such known couplings have no means for limiting the axial excursions of the shafts; as a consequence the prior art coupling discs can be over-stressed and fractured.

It is an object of this invention to set forth a novel expansible coupling which does not have the limitations or disadvantages cited above which are found in the prior art.

It is also an object of this invention to set forth a expansible coupling for, and in combination with, a pair of tubular elements, comprising a sleeve having a longitudinal axis; and first and second tubular elements; wherein end portions of said elements are mounted, through given extents thereof, onto said sleeve; said elements are collinearly aligned with said axis; and ends of said elements, which terminate said end portions, are (a) spaced apart, and (b) mutually confronting; and further including a first disc centrally coupled to one of said element ends; and a second disc centrally coupled to the other of said element ends; wherein peripheries of said discs are mutually fastened together; said elements have an outside diameter defined by a radius of a given dimension; and said given extents, of said sleeve-mounted end portions have lengths which are at least of said given dimension.

It is also an object of this invention to disclose a expansible coupling for, and in combination with, a pair of tubular elements, comprising a sleeve having a longitudinal axis; and first and second tubular elements; wherein end portions of said elements are mounted onto said sleeve; said elements are collinearly aligned with said axis; and ends of said elements, which terminate said end portions, are (a) spaced apart, and (b) mutually confronting; and further including a first, resilient web disposed transverse to said axis, and centrally coupled to one of said element ends; a second, resilient web disposed in parallel with said first web, with ends of said first web fastened to ends of said second web; wherein said second web is centrally coupled to the other of said element ends; said element end of one of said shafts is in contacting engagement with said sleeve, fully circumferentially thereof; said sleeve has an end which is in contacting engagement with said one element, fully circumferentially thereof; and intermediate said end of said sleeve and said end of said one element there obtains an axially-extended, annular void between said sleeve and said one element.

Further objects of this invention as well as the novel features thereof will become more apparent by reference to the following description taken in conjunction with the accompanying figures in which:

FIG. 1 is an axially-taken, cross-sectional view of a expansible coupling according to an embodiment of the invention which comprises the best mode thereof, contemplated by the inventors, for carrying out the invention;

FIG. 2 is a cross-sectional view taken along section 2—2 of FIG. 1;

FIG. 3 is a partial cross-sectional view taken along section 3—3 of FIG. 1; and

FIGS. 4 and 5 are fragmentary views taken along aspects 4—4 and 5—5, respectively, in FIG. 3.

As shown in the figures, an expansible coupling 10, according to the best mode of its practice known to the inventors, comprises a sleeve 12 which has a longitudinal axis 14, and upon which are mounted end portions 16 and 18 of tubular elements 20 and 22, respectively. Tubular ends 24 and 26, of the elements 20 and 22, are spaced apart in a confronting relationship and have mounted thereto thin-metal resilient webs or discs 28 and 30. In this depicted embodiment, the discs are circular. They are somewhat dish-shaped, having shouldered, inwardly-directed peripheries and they are fastened together about their peripheries.

Each end portion 16 and 18, of the tubular elements 20 and 22, has a pair of parallel grooves 32 and 34 formed therein in which to receive a pair of retaining rings 36 and 38. Each pair of rings 36 and 38 secures a resilient disc or web 28 or 30 onto the end portion of a tubular element. The rings 36 and 38 are set in the grooves 32 and 34, and fix a web 28 or 30 therebetween against axial movement. A first of the tubular elements, element 22, has formed therein an annular recess 40. One end of the sleeve 12 is nested in the recess 40, and held therein, securely at opposite sides thereof, by pins 42 which penetrate both element 22 and sleeve 12. The second tubular element has pins 42 fixed therein and protruding therefrom, internally, and these pins, further, are slidably engaged with axially-extended slots 44 formed in the sleeve 12.

The sleeve 12 and second tubular element 20 are in contacting engagement fully about the circumference thereof, at the end 24 of the second tubular element 20, and also at an end 46 of the sleeve 12 where there is provided a prominent, annular land 48. Therebetween, the sleeve 12 and second tubular element 20 have an annular void 50.

Sleeve 12 and tubular element 20 have a widely-reaching, or wide-stanced contacting engagement therebetween. As just noted, they have a void 50 therebetween, the same extending, axially, for a principal portion of the length of the overall sleeve 12. Sleeve 12 and element 20 engage only (a) through a narrow extent of portion 16 and (b) through the narrow land 48. These widely-spaced-apart engagements preserve a collinear alignment of element 20 with recess-nested, and securely pinned element 22. Too, the considerably axially-extended void 50 insures that, between element 20 and sleeve 12, there will be a minimum of friction—so that relative movement therebetween can be effected with little resistance.

The radii "R1" indicated in FIG. 1 are of the same dimension, and define the outside diameter of each of the tubular elements 20 and 22. "D-1" defines the extent of the engagement of the first of the tubular elements 22 with the sleeve 12. It can be seen that this extent "D-1" of sleeve mounting, of the first tubular element 22, comprises a distance which is not less than that comprised by "R1".

Coupling 10 is designed to support and confine therewithin a rotary shaft (not shown) which is subject to thermally-induced axial elongation and contraction. Coupling 10, then, accommodates for such axial excursions of the supported and confined shaft in that tubular element 20 and sleeve 12 can manifest relative slidable movement therebetween. To facilitate this, dry film lubricant is introduced between land 48 and element 20, and between end 24 and sleeve 12.

An embodiment of coupling 10, as designed for actual reduction to practice, comprises discs or webs 28 and 30 of approximately sixteen-inch diameters, and tubular elements 20 and 22 of approximately five-inch outside diameters. Such design contemplates resilient flexure of the webs 28 and 30 through a range of approximately three-quarters of an inch. Slots 44, then, extend axially, for either sides of the pins 42 engaged therewith, approximately three-eights of an inch. The ends of the slots 44, of course, define limit stops; the same delimit the amount of relative axial excursion that may occur between sleeve 12 and element 20. This delimiting insures that the webs 28 and 30 will not be overstressed and damaged as a result thereof.

While we have described our invention in connection with a specific embodiment thereof, it is to be clearly understood that this is done only by way of example and not as a limitation to the scope of our invention as set forth in the objects thereof and in the appended claims.

We claim:

1. An expansible coupling for, and in combination with, a pair of tubular elements, comprising:
   a sleeve having a longitudinal axis; and
   first and second tubular elements; wherein
   end portions of said elements are mounted, through given extents thereof, onto said sleeve;
   said elements are collinearly aligned with said axis; and
   ends of said elements, which terminate said end portions, are (a) spaced apart, and (b) mutually confronting; and further including
   a first disc centrally coupled to one of said element end portions; and
   a second disc centrally coupled to the other of said element end portions; wherein
   peripheries of said discs are mutually fastened together;
   said end portions of one of said elements is in contacting engagement with said sleeve, fully circumferentially thereof;
   said sleeve has an end which is in contacting engagement with said one element, fully circumferentially thereof; and
   intermediate said end of said sleeve and said end of said one element there obtains an axially-extended, annular void between said sleeve and said one element.

2. An expansible coupling, according to claim 1, wherein:
   said sleeve has a plurality of different outside diameters.

3. An expansible coupling, according to claim 2, wherein:
   said elements have a common, inside diameter; and
   one of said outside diameters of said sleeve, and said common, inside diameter of said elements, cooperatively define said annular void about said sleeve.

4. An expansible coupling, according to claim 1, wherein:
   one of said end portions is coupled to said sleeve for movement, relative to said sleeve, along said axis.

5. An expansible coupling, according to claim 1, wherein:
   only one of said elements is coupled to said sleeve for movement, relative to said sleeve, along said axis.

6. An expansible coupling, according to claim 1, wherein:
   said one end of said sleeve and said one end portion are fastened together.

7. An expansible coupling, according to claim 1, wherein:
   said end portions of both said elements are in contacting engagement with said sleeve, fully circumferentially thereof.

8. An expansible coupling, according to claim 1, wherein:
   said sleeve has a major length thereof which is spaced apart from both of said elements.

9. An expansible coupling, according to claim 1, wherein:
   said sleeve has an annular land, of narrow extent relative to an overall length of said sleeve, at one end thereof; and
   one of said elements is in contacting engagement with said land, fully circumferentially thereof.

10. An expansible coupling, according to claim 5, wherein:
    said one element has a pin fixed in the wall thereof, said pin having an end protruding inwardly from said wall;
    said sleeve has an axially-extended slot formed in the wall thereof; and
    said protruding end of said pin is in penetration of said slot.

11. An expansible coupling, according to claim 5, wherein:
    said one element and said sleeve have means cooperative for limiting movement of said one element.

12. An expansible coupling, according to claim 11, wherein:
    said limiting means comprises (a) an axially-extended recess formed in said sleeve, and (b) a pin, fixed in and protruding from said one element, intruding into said recess.

13. An expansible coupling, according to claim 1, wherein:
    said first and second discs are circular, and are fastened together about the peripheries thereof.

* * * * *